(12) United States Patent
Ruffner et al.

(10) Patent No.: US 9,802,533 B2
(45) Date of Patent: Oct. 31, 2017

(54) MACHINE ROOF INTEGRATED LIGHTING SYSTEM

(71) Applicant: Caterpillar SARL, Geneva (CH)

(72) Inventors: Thomas Sherwood Ruffner, Washington, IL (US); Anthony James Pollock, Cleveland (GB)

(73) Assignee: Caterpillar SARL, Geneva (CH)

( * ) Notice: Subject to any disclaimer, the term of this patent is extended or adjusted under 35 U.S.C. 154(b) by 99 days.

(21) Appl. No.: 14/627,985

(22) Filed: Feb. 20, 2015

(65) Prior Publication Data

US 2016/0243982 A1 Aug. 25, 2016

(51) Int. Cl.
| | | |
|---|---|---|
| *B60Q 1/26* | (2006.01) | |
| *B60Q 1/50* | (2006.01) | |
| *B60Q 1/00* | (2006.01) | |
| *B60Q 1/46* | (2006.01) | |

(52) U.S. Cl.
CPC .............. *B60Q 1/50* (2013.01); *B60Q 1/0035* (2013.01); *B60Q 1/2611* (2013.01); *B60Q 1/46* (2013.01)

(58) Field of Classification Search
CPC ........... B60Q 1/50; B60Q 1/2611; B60Q 1/26
USPC ............... 340/468, 471, 472, 478; 362/23.07
See application file for complete search history.

(56) References Cited

U.S. PATENT DOCUMENTS

| | | | |
|---|---|---|---|
| 4,152,854 A | 5/1979 | Berry, Jr. et al. | |
| 4,234,908 A | 11/1980 | McGee | |
| 4,921,578 A * | 5/1990 | Shiraishi | G01G 19/08 177/136 |
| 5,010,319 A | 4/1991 | Killinger | |
| 5,877,681 A * | 3/1999 | Williams | B60Q 1/2611 340/468 |
| 6,558,018 B1 * | 5/2003 | Blum | B62B 5/00 362/183 |
| 7,300,096 B2 * | 11/2007 | Maguire | B60J 11/00 296/136.1 |
| 7,997,775 B2 * | 8/2011 | Hurwitz | B60Q 1/2615 362/464 |
| 2002/0048173 A1 | 4/2002 | Schmucker | |
| 2005/0167165 A1 * | 8/2005 | Takeda | B60G 5/04 177/136 |
| 2008/0122236 A1 | 5/2008 | Peterson | |
| 2009/0279319 A1 * | 11/2009 | Sindelar | B60Q 1/0088 362/545 |
| 2014/0104056 A1 * | 4/2014 | Ramos | B60Q 1/46 340/471 |
| 2014/0231153 A1 | 8/2014 | Fukasu et al. | |
| 2015/0066290 A1 * | 3/2015 | Ruffner | B60Q 1/50 701/33.9 |
| 2015/0251584 A1 * | 9/2015 | Deyaf | H04B 5/0037 307/10.8 |

FOREIGN PATENT DOCUMENTS

| | | |
|---|---|---|
| GB | 2273475 | 6/1994 |
| GB | 2457913 | 9/2009 |

\* cited by examiner

*Primary Examiner* — Phung Nguyen
(74) *Attorney, Agent, or Firm* — Miller, Matthias & Hull LLP; James S. Bennin

(57) ABSTRACT

An informational lighting system for a machine having a cab may include a plurality of beacon lights located at a roof of the cab, the beacon lights may be located at discrete locations. The informational lighting system may further include a controller configured to provide signals for flashing the beacon lights.

19 Claims, 6 Drawing Sheets

MACHINE ROOF INTEGRATED LIGHTING SYSTEM

TECHNICAL FIELD

The present disclosure generally relates to lighting systems, and more particularly, relates to informational lighting systems for machines.

BACKGROUND

Informational lighting systems are used for a variety of purposes in different industries. As opposed to lighting systems used simply for illumination, an informational lighting system may convey safety or other information to an entity outside or otherwise in the vicinity of a vehicle or machine using the informational lighting system. For example, such a system may be employed to show the location or orientation of a vehicle to oncoming or approaching vehicles, or to signal other information. In the context of work machines, such as dump trucks, such information may be related to whether the bed of the truck is full or able to take on additional load. Further, an informational lighting system can be designed according to a variety of considerations, and may include various types of light integrations, light sources, light colors, flashing patterns and light locations.

While effective for such indicated purposes, current informational lighting systems extend upwardly away from the body of the vehicle or machine to which they are mounted. This often results in significant drawbacks. For example, exposed lights may be more susceptible to damage due to increasing the height of the vehicle or machine and having little or no protection from the elements and surrounding structure. Such damage necessarily increases light replacement costs and frequency. Additionally, an exposed and protruding informational lighting system may unnecessarily increase vehicle and system clearances during operation and shipping.

US Patent Publication No. 2008/0122236 discloses exterior lights integrated into a load carrier rack mounted on a passenger vehicle. The disclosed system describes fog and off-road lights for illumination purposes. However, such a system does not signal information or precise vehicle location to an outside observer. Further, such a system requires mounting a load carrier rack onto a vehicle roof to benefit from the added lights.

Accordingly, there is a need for an improved informational lighting system for a machine.

SUMMARY OF THE DISCLOSURE

In one aspect, an informational lighting system for a machine having a cab is disclosed. The informational lighting system may include a plurality of beacon lights located at a roof of the cab, the beacon lights being located at discrete locations, and a controller configured to provide signals for flashing the beacon lights.

In another aspect, a machine is disclosed. The machine may include a cab and an informational lighting system including a plurality of beacon lights built into a roof of the cab, the beacon lights being located at discrete locations, and a controller configured to provide signals for flashing the beacon lights.

In another aspect, a method of conveying information about a machine to a surrounding vicinity of the machine, the machine including a cab having a roof, and a plurality of beacon lights at discrete locations of the roof and a payload light on the cab, wherein at least one beacon light is disposed in close proximity to the payload light is disclosed. The method may include, during a machine first mode, activating the plurality of beacon lights in a flashing mode, during a machine second mode, activating the at least one beacon light disposed in close proximity to the payload light in an off mode and activating the payload light in an on mode, and activating the plurality of beacon lights in the flashing mode subsequent to activating the payload light in an off mode and returning to the machine first mode.

These, and other aspects and features of the present disclosure, will be better understood upon reading the following detailed description when taken in conjunction with the accompanying drawings.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
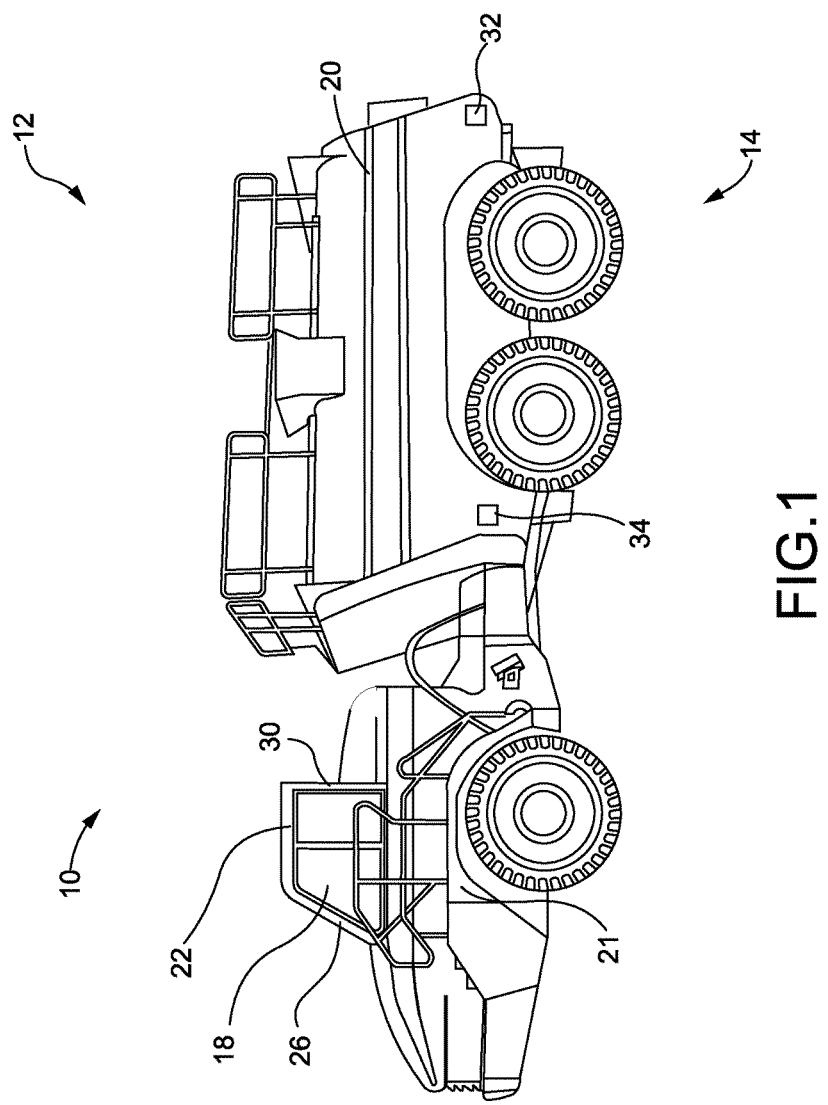
FIG. 1 is a side view of a vehicle constructed in accordance with the present disclosure.

Referring now to the drawings, and with specific reference to FIG. 1, a machine constructed in accordance with the present disclosure is generally referred to by reference numeral 10. The machine 10 may be of a variety of vehicle types used across multiple industries. In one embodiment, the machine 10 may be a construction vehicle 12, although the teachings of the present disclosure can be used across other disciplines such as, but not limited to, earthmoving and agricultural machines as well. More specifically, the machine 10 may be an articulated truck 14, as shown in FIG. 1.

As illustrated, the machine 10 includes a cab 18, a payload bed 20 and a transmission 21. The cab 18 may be enclosed or partially enclosed, and further may incorporate a roof 22. A forward end 26 and an aft end 30 may be used to define opposite ends of the roof 22. Additionally, the machine 10 may include an external control 32 and a sensor 34 for sensing a payload condition within the payload bed 20.

Figure 2:
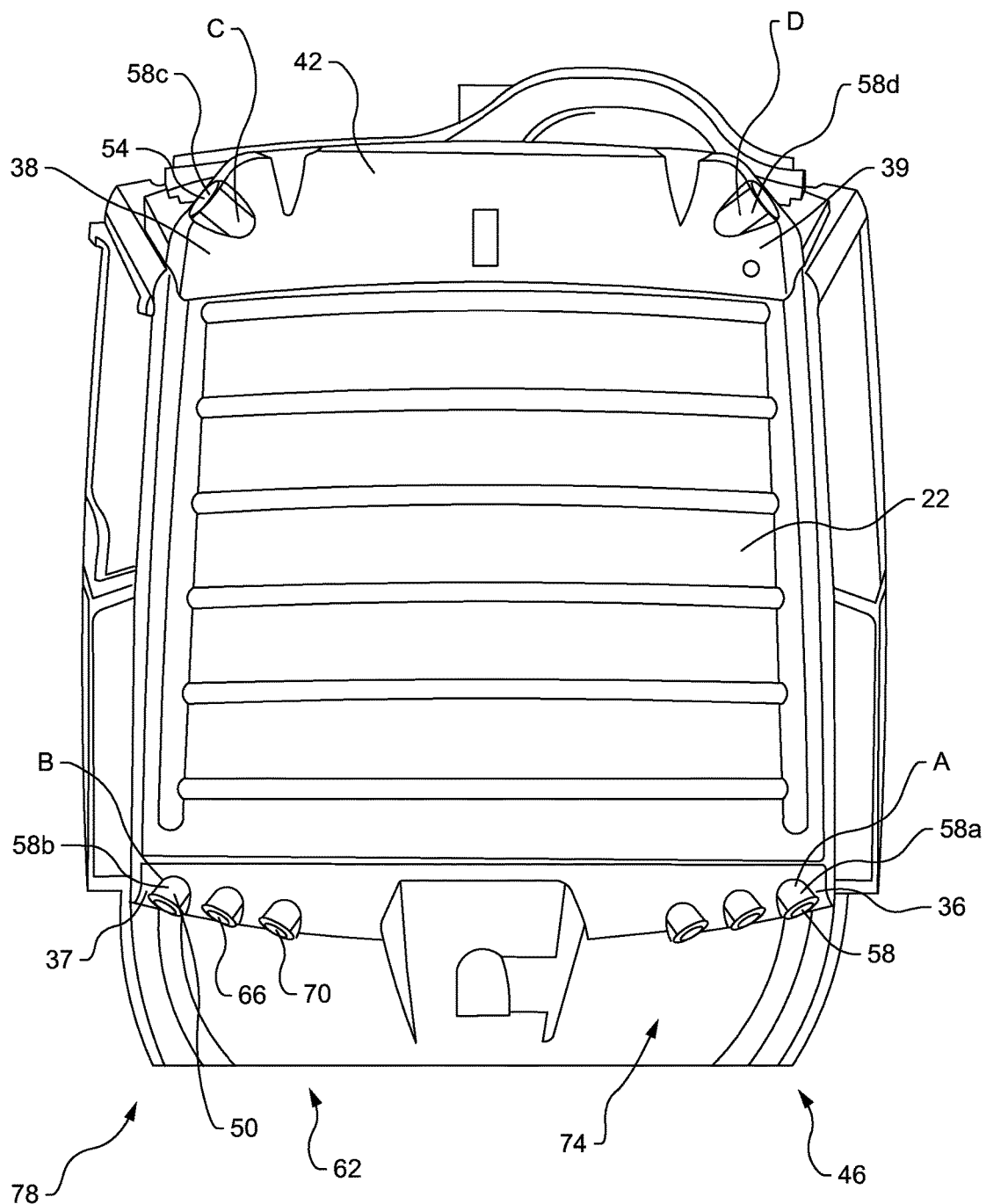
FIG. 2 is a top view of a roof constructed in accordance with the present disclosure.

Turning to FIG. 2, the roof 22 is shown with a first corner 36, a second corner 37, a third corner 38 and a fourth corner 39. In other embodiments, it is to be understood that the roof 22 may have more or fewer than four corners. The roof 22 may also form a visor 42, which may serve to shield the operator or the machine 10 from light, glare, debris or inclement weather. Additionally, the roof 22 may be made from a polymer, ceramic, metal or metal alloy.

To better integrate machine 10 components, the roof 22 may also incorporate an informational lighting system 46. The informational lighting system 46 may include a plurality of lights 50 integrated with, and located at various positions and orientations within, the roof 22. The lights 50 may be light emitting diodes 54, although other types of lights, such as incandescents and fluorescents, are certainly possible.

In one embodiment, the informational lighting system 46 may include one or more beacon lights 58, 58*a*, 58*b*, 58*c*, 58*d*, each of which may be located at the roof 22. Further, the one or more beacon lights 58 may be located at discrete locations A, B, C, D. The beacon lights 58 may be used to visibly identify the location of the machine 10 to an entity outside the machine 10. The beacon lights 58 may allow the vehicle to be located during daytime and nighttime, during all weather conditions and amid various local environmental and worksite conditions. To aid visibility, the beacon lights 58 may flash in a sequential fashion, where a single beacon light 58 or group of beacon lights 58 may flash before another beacon light 58 or group of beacon lights 58 flashes. Similarly, the beacon lights may also flash in a simultaneous sequence, where all of the one or more beacon lights 58 may flash simultaneously. Flashing may be defined as one or more beacon lights 58 turning on then turning off, and may further include repeating this process.

In order to maximize visibility from all directions, the one or more beacon lights 58 may be located at one or more corners 36, 37, 38, 39 of the roof 22, as shown in FIG. 2. In an alternate embodiment, one or more beacon lights 58 may be located at one or more corners 36, 37, 38, 39 of the roof 22, while one or more beacon lights 58 may be located at other positions within the roof 22. In another embodiment, none of the beacon lights 58 may be located at a corner 36, 37, 38, 39, and all of the beacon lights 58 may be located at other positions within the roof 22. Further, the informational lighting system 46 may include four beacon lights 58, and the beacon lights 58 may all be the same color, for example, yellow, but a different number of lights 50 and colors are certainly possible.

Figure 3:
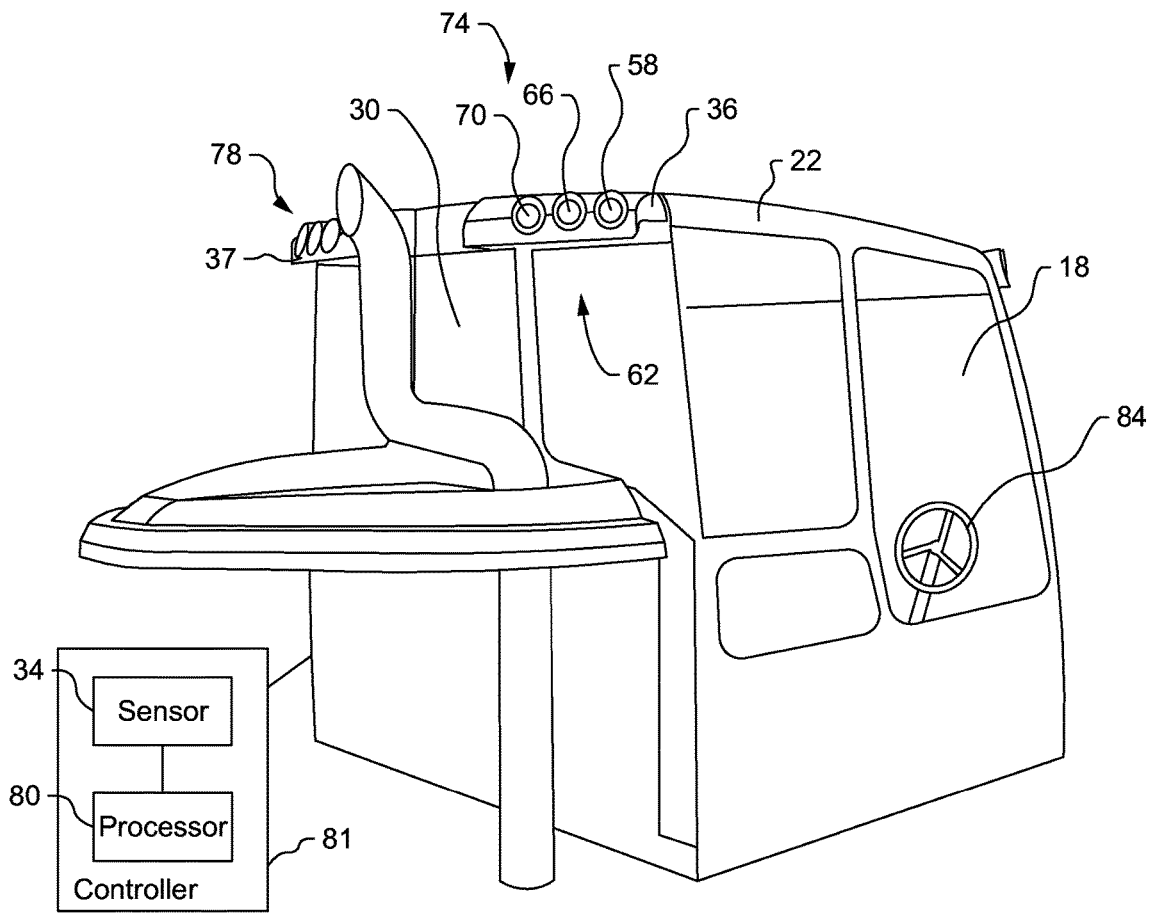
FIG. 3 is a perspective view of a cab constructed in accordance with the present disclosure, taken from a side and rearward perspective.
Figure 4:
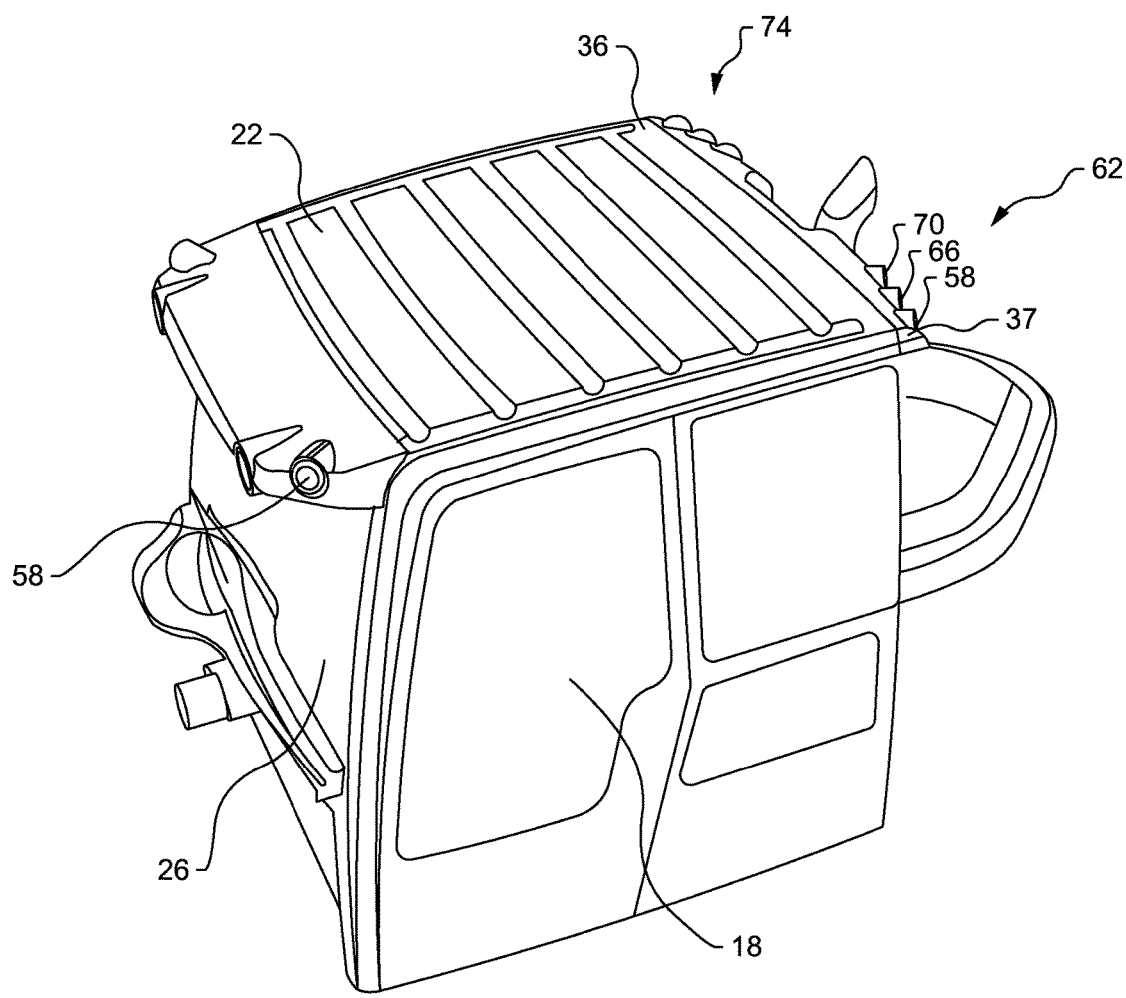
FIG. 4 is another perspective view of the cab of FIG. 3, taken from an upper and forward perspective.

In addition to the one or more beacon lights 58, the informational lighting system 46 may include a payload monitoring system 62. The payload monitoring system 62 may include a first light 66 and a second light 70. The first light 66 may be of a first color, and the second light 70 may be of a second color. Each of these first and second colors 66, 70 may be, for example, green and red respectively, and each may be different from the beacon light 58 color. Additionally, as best shown in FIGS. 2, 3 and 4, the first and second lights 66, 70 may be located at the aft end 30 of the roof 22, but each are just examples. Further, one or both of the first and second lights 66, 70 of the payload monitoring system 62, which may also be known as payload monitoring lights or payload lights, may be located in close proximity to at least one of the beacon lights 58.

The first and second lights 66, 70 may also be arranged in multiple sets. Each set may have a horizontal arrangement, as shown, although other arrangements including, but not limited to, vertical, diagonal and clustered sets are certainly possible. For example, the first and second lights 66, 70 may be provided in a first set 74 and a second set 78. In the depicted embodiments, the first set 74 may be provided on a right side of the machine 10 while the second set may be provided on a left side, but of course other configurations and positions are possible. Further, the payload monitoring system 62 may include additional lights beyond the first and second lights 66, 70 and first and second sets 74, 78. One or more beacon lights 58 may also be used to signal a transition between first and second lights 66, 70.

In operation, the machine 10 may be loaded with various payloads. For example, the machine 10 may be used in mining or construction operations where the payload bed 20 is loaded with gravel, dirt or the like. The sensor 34 may sense a variety of payload conditions pertaining to the payload, or to the interaction of the machine 10 with the payload. The payload conditions may address, but are not limited to addressing, payload weight, payload type, payload distribution, payload loading, machine stability, machine responses to the payload, environmental factors or operator inputs. Further, the machine 10 could incorporate a plurality of sensors 34, and each of these sensors 34 could sense one or more of the aforementioned payload conditions.

According to data gathered by the sensor 34, the payload monitoring system 62, using an included processor 80 and controller 81 as shown in FIG. 3, may be configured to generate an output signal based on the sensor signal and may accordingly activate a visual signal to an operator or entity outside the machine 10. This visual signal may include the activation of the first light 66, the second light 70, one or more beacon lights 58 or a combination of the first and second lights 66, 70 and one or more beacon lights 58. The visual signal may include flashing or constantly illuminating both, or either, of the first and second lights 66, 70, or one or more beacon lights 58.

The visual signal could be used to convey various information regarding the machine 10 and payload. For example, the visual signal could indicate that the payload can be increased, should be decreased or should be altered, as with having a green light to indicate the payload bed 20 should continue to be loaded and a red light indicating the payload bed 20 cannot accept any more payload from a loader or the like. In this manner, the payload monitoring system 62 may activate the first light 66, second light 70 or first and second light 66, 70 according to a payload condition sensed by the sensor 34. Further, the processor 80 may cause the beacon lights 58 to flash in the above-mentioned simultaneous or sequential sequences. Additionally, the beacon lights 58 may also be utilized as a part of the payload monitoring system 62 to convey machine 10 or payload information.

Figure 5:
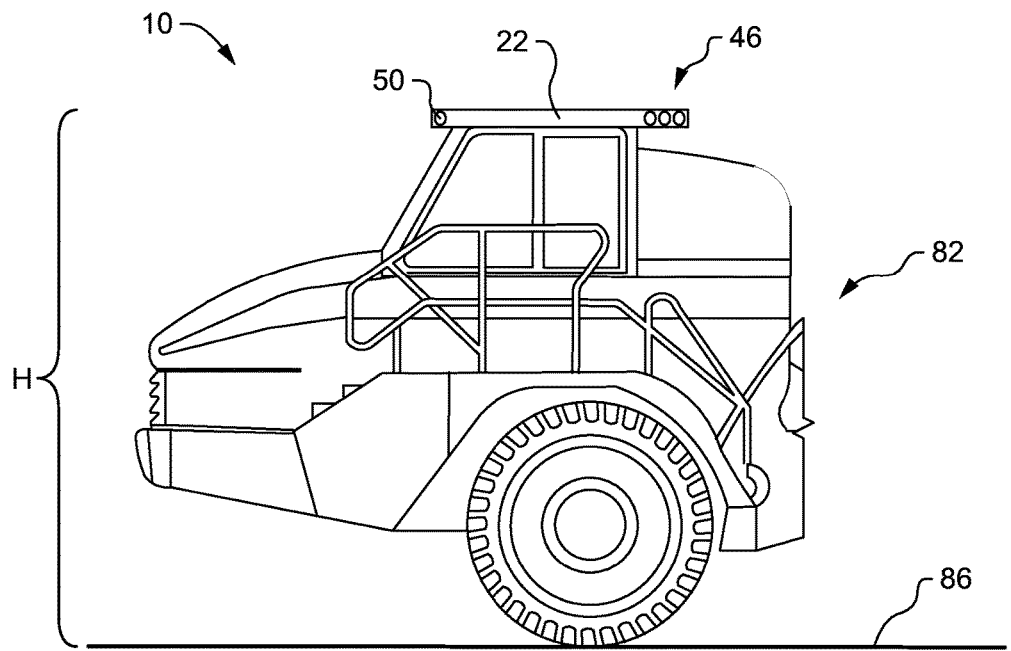
FIG. 5 is a side view of a vehicle with a cab and an informational light system constructed in accordance with the present disclosure.

The present disclosure also decreases an overall height H (as measured from a ground 86 to the roof 22) of the machine 10, shown in FIG. 5. More specifically, the informational lighting system 46 is integrated into the machine 10 without increasing its height. In so doing, the integrated nature of the informational lighting system 46 also better protects the lights 50 from damage and improves their visibility. The lights 50 of the informational lighting system 46 may be integrated into the roof 22, meaning they may be built into the roof 22. This integration may better protect the lights 50 by using the roof 22 material to avoid light 50 damage.

Figure 6:
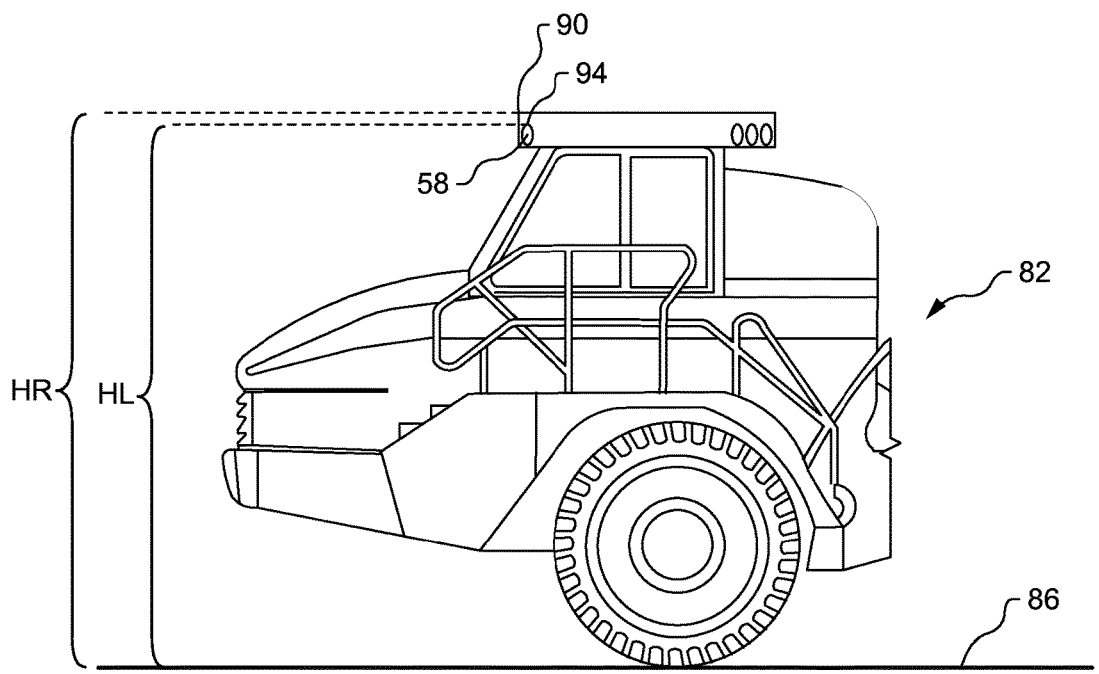
FIG. 6 is a side view of another embodiment of the vehicle and the informational light system of FIG. 5 constructed in accordance with the present disclosure.

Additionally, an upper roof extent 90 and an upper beacon light extent 94 can be seen in FIG. 6. When the machine 10 is upright and on level ground 86, a distance HR between the ground 86 and the upper roof extent 90 may be greater than a distance HL between the ground 86 and the upper beacon light extent 94. Accordingly, the lights 50 and beacon lights 58 may be integrated into the roof 22, and further may be located under the upper roof extent 90, relative to the ground 86.

The processor 80 and controller 81 may output a signal to activate the beacon lights 58. When activated, the beacon lights 58 may flash according to a pattern, including where beacon lights 58a, 58b, 58c, and 58d flash in sequence. Alternatively, one or more of the beacon lights 58 may flash together simultaneously when activated, such as opposite corners flashing simultaneously, although other flashing sequences and patterns are certainly possible. The processor 80 and controller 81 may output such a signal upon receipt of an input signal indicative of a status. The input signal may originate from a status of the machine 10 reaching a certain speed, a control 84 selected by an operator, a transmission 21 placed in a certain position, the sensor 34 sensing a payload condition, a combination of transmission 21 position and operator-selected control 84, an external control 32 selected by an entity outside the machine 10, the machine roading or an automatic process. Roading may defined as the machine 10 traveling on a road, or similar surface.

Further, the processor 80 and controller 81 may output a signal to deactivate the beacon lights 58. The processor 80 and controller 81 may output such a signal upon receipt of an input signal indicative of a status. The input signal may originate from a status of the machine 10 reaching a certain speed, a control 84 selected by an operator, a transmission 21 placed in a certain position, the sensor 34 sensing a payload condition, a combination of transmission 21 position and operator-selected control 84, an external control 32 selected by an entity outside the machine 10, the machine 10 roading or an automatic process.

For example, the controller 81 may deactivate the beacon lights 58 when the transmission 21 is placed in drive. However, the control 84, such as a joystick or a button, may be able to activate or deactivate the beacon lights 58 when the transmission 21 is in such a position. Subsequently, the beacon lights 58 could automatically activate or deactivate when the machine 10 reaches a given speed.

The machine 10 may operate in a first mode, which may involve activating the plurality of beacon lights 58 in a flashing mode. The machine 10 may also operate in a second mode, which may involve activating at least one beacon 58 light disposed in close proximity to the payload light 62, 66 in an off mode and activating the payload light 62, 66 in an on mode. Further, the machine 10 may activate the plurality of beacon lights 58 in the flashing mode subsequent to activating the payload light 62, 66 in an off mode and returning to the machine 10 first mode.

The machine 10 may transition between such first and second modes according to an input signal indicative of a status, where the processor 80 and controller 81 may output a signal to enter the first or second modes. The processor 80 and controller 81 may output such a signal upon receipt of an input signal indicative of a status. The input signal may originate from a status of the machine 10 reaching a certain speed, a control 84 selected by an operator, a transmission 21 placed in a certain position, the sensor 34 sensing a payload condition, a combination of transmission 21 position and operator-selected control 84, an external control 32 selected by an entity outside the machine 10 or an automatic process.

INDUSTRIAL APPLICABILITY

In operation, the present disclosure sets forth an informational lighting system which can find industrial applicability in a variety of settings. For example, the disclosure may be advantageously employed in the efficient and productive operation of machines such as, but not limited to, mining, construction and agriculture machines.

One specific example is an articulated truck. More specifically, the informational lighting system may integrate a plurality of lights into the roof of a cab of the machine. The integrated nature of the informational lighting system may serve to protect the lights from damage and improve their visibility. The disclosed informational lighting system may also facilitate easier repair or replacement of the lights, saving costs and maintenance time. The integrated lights may additionally reduce the height of the machine, thereby reducing required vehicle clearances for shipping and maneuvering purposes, increasing flexibility. Further, their integrated positioning may be aesthetically beneficial.

The informational lighting system may include beacon lights for conveying the location of a vehicle to entities outside the vehicle. The beacon lights may be located at corners of the roof for maximum visibility and light dispersal. The informational lighting system may also include a payload monitoring system with a first and second light. The payload monitoring system may convey, using the first and second lights, information pertaining to a payload condition as sensed by a sensor. The first and second lights may also be of differing colors. All lights of the informational lighting system may be light emitting diodes for better visibility during all weather, times, worksite and environmental conditions, or may be other types of lights, as described above.

Figure 7:
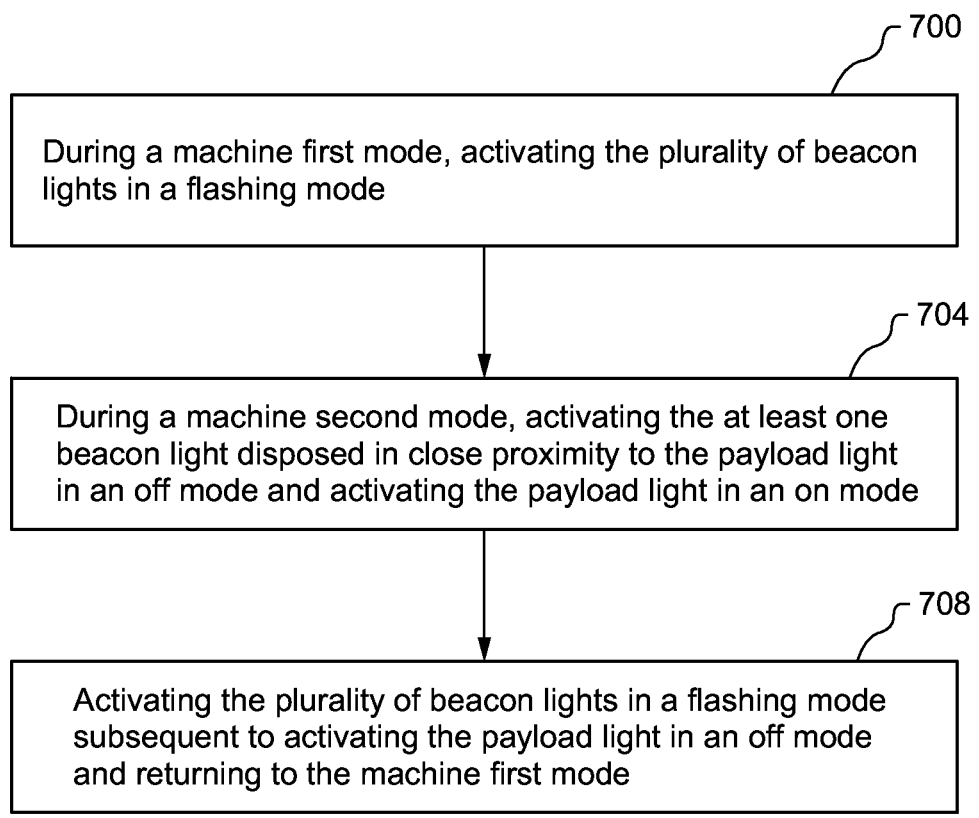
FIG. 7 is a flowchart depicting a sample sequence of actions which may be practiced in an embodiment of the present disclosure.

Based on the foregoing, it can be seen that the present disclosure further sets forth a method of conveying information about a machine to a surrounding vicinity of the machine, the machine including a cab having a roof, and a plurality of beacon lights at discrete locations of the roof and a payload light on the cab, wherein at least one beacon light is disposed in close proximity to the payload light, as best illustrated in the flowchart of FIG. 7. The method may include during a machine first mode, activating the plurality of beacon lights in a flashing mode, as shown in step 700. While shown with both beacon and payload lights, it can be understood that the machine can also include only beacon lights. Next, the method may include during a machine second mode, activating the at least one beacon light disposed in close proximity to the payload light in an off mode and activating the payload light in an on mode, as shown in step 704. Further, the method may include activating the plurality of beacon lights in the flashing mode subsequent to activating the payload light in an off mode and returning to the machine first mode, as shown in step 708.

The disclosed informational lighting system may be original equipment on new vehicles, or added as a retrofit to existing vehicles.

What is claimed is:

1. An informational lighting system for a machine having a cab, the informational lighting system comprising:
    a plurality of beacon lights built into and integrated with
        a roof of the cab,
        the roof including a visor,
        the plurality of beacon lights and one or more payload monitoring lights being built into the visor; and
    a controller configured to provide signals for flashing the beacon lights.

2. The informational lighting system of claim 1, wherein a distance between an upper extent of the roof and the ground is greater than a distance between an upper extent of the plurality of beacon lights and the ground when the machine is upright on level ground.

3. The informational lighting system of claim 1, wherein the machine includes one or more payload monitoring lights in close proximity to at least one of the beacon lights.

4. The informational lighting system of claim 1, wherein the plurality of beacon lights are light-emitting diodes.

5. The informational lighting system of claim 1, wherein the plurality of beacon lights are located at one or more corners of the roof.

6. The informational lighting system of claim 1, wherein the plurality of beacon lights are activated according to a signal from the controller, wherein the controller outputs the signal upon receiving an input signal indicative of a status indicating at least one of the machine reaching a certain speed, a control selected by an operator, a transmission placed in a certain position, a sensor sensing a payload condition, a combination of transmission position and operator-selected control, an external control selected by an entity outside the machine and an automatic process.

7. The informational lighting system of claim 1, wherein the plurality of beacon lights are deactivated according to a signal from the controller, wherein the controller outputs the signal upon receiving an input signal indicative of a status indicating at least one of a transmission placed in a certain position, a control selected by an operator, a combination of transmission position and operator-selected control, a sensor sensing a payload condition, activating a payload-sensing system or an external control selected by an entity outside the machine.

8. The informational lighting system of claim 1, wherein the controller signals the plurality of beacon lights to flash in a sequential sequence.

9. The informational lighting system of claim 1, wherein the controller signals the beacon lights to flash in a simultaneous sequence.

10. The informational lighting system of claim 1, wherein the informational lighting system includes a payload monitoring system, the payload monitoring system including a first light of a first color and a second light of a second color, wherein the payload monitoring system activates the first light and the second light according to a payload condition sensed by the sensor.

11. A machine, comprising:
a cab;
an informational lighting system including a plurality of beacon lights built into and integrated with a roof of the cab,
the roof including a visor,
the plurality of beacon lights and one or more payload monitoring lights being built into the visor; and
a controller configured to provide signals for flashing the beacon lights.

12. The machine of claim 11, wherein a distance between an upper extent of the roof and the ground is greater than a distance between an upper extent of the plurality of beacon lights and the ground when the machine is upright on level ground.

13. The machine of claim 11, wherein the plurality of beacon lights are located at one or more corners of the roof.

14. The machine of claim 11, wherein the plurality of beacon lights are activated according to a signal from the controller, wherein the controller outputs the signal upon receiving an input signal indicative of a status indicating at least one of the machine reaching a certain speed, a control selected by an operator, a transmission placed in a certain position, a sensor sensing a payload condition, a combination of transmission position and operator-selected control, or an external control selected by an entity outside the machine and an automatic process.

15. The machine of claim 11, wherein the plurality of beacon lights are deactivated according to a signal from the controller, wherein the controller outputs the signal upon receiving an input signal indicative of a status indicating at least one of a transmission placed in a certain position, a control selected by an operator, a combination of transmission position and operator-selected control, a sensor sensing a payload condition, activating a payload-sensing system or an external control selected by an entity outside the machine.

16. The machine of claim 11, wherein the controller signals the plurality of beacon lights to flash in a sequential sequence.

17. The machine of claim 11, wherein the controller signals the plurality of beacon lights to flash in a simultaneous sequence.

18. A method of conveying information about a machine to a surrounding vicinity of the machine, the machine including a cab having a roof, and a plurality of beacon lights at discrete locations of the roof and a payload light on the cab, wherein at least one beacon light is disposed in close proximity to the payload light, the method comprising:
during a machine first mode, activating the plurality of beacon lights in a flashing mode;
during a machine second mode, activating the at least one beacon light disposed in close proximity to the payload light in an off mode and activating the payload light in an on mode; and
activating the plurality of beacon lights in the flashing mode subsequent to activating the payload light in an off mode and returning to the machine first mode.

19. The method of claim 18, wherein a distance between an upper extent of the roof and the ground is greater than a distance between an upper extent of the plurality of beacon lights and the ground when the machine is upright on level ground.

* * * * *